US007500190B1

(12) United States Patent
Bhatt

(10) Patent No.: US 7,500,190 B1
(45) Date of Patent: Mar. 3, 2009

(54) VISUAL FEEDBACK TO ILLUSTRATE EFFECTS OF EDITING OPERATIONS

(75) Inventor: Nikhil M. Bhatt, Cupertino, CA (US)

(73) Assignee: Apple Inc., Cupertino, CA (US)

(*) Notice: Subject to any disclaimer, the term of this patent is extended or adjusted under 35 U.S.C. 154(b) by 483 days.

(21) Appl. No.: 11/105,874

(22) Filed: Apr. 13, 2005

(51) Int. Cl.
*G06F 3/00* (2006.01)
*G09G 5/00* (2006.01)

(52) U.S. Cl. ............... 715/704; 715/725; 715/724; 715/726; 345/646; 345/440.1

(58) Field of Classification Search ............ 345/440.1, 345/646, 955; 715/725, 724, 726, 704, 716
See application file for complete search history.

(56) References Cited

U.S. PATENT DOCUMENTS

| | | | | |
|---|---|---|---|---|
| 5,544,295 | A * | 8/1996 | Capps | 345/473 |
| 5,640,522 | A * | 6/1997 | Warrin | 715/732 |
| 5,850,229 | A * | 12/1998 | Edelsbrunner et al. | 345/473 |
| 5,880,743 | A * | 3/1999 | Moran et al. | 345/473 |
| 6,094,199 | A * | 7/2000 | Turkiyyah et al. | 345/419 |
| 6,847,468 | B2 * | 1/2005 | Ferriere | 358/1.2 |
| 7,062,416 | B1 * | 6/2006 | Arita et al. | 703/2 |
| 2004/0174382 | A1 * | 9/2004 | Staples et al. | 345/619 |
| 2004/0199395 | A1 * | 10/2004 | Schulz | 704/278 |
| 2006/0010420 | A1 * | 1/2006 | Peterson et al. | 717/106 |

OTHER PUBLICATIONS

Microsoft Computer Dictionary, 2002, Microsoft Press, Fifth Edition, 538.*
Fulton, Nancy, "Autodesk VIZ: Working with the Modifier Stack," Autodesk Inc., 2005, located at http://autodesk.com/adsk/servlet/item?siteID=123112&id=3455924&linkID=982674, 9 pages.

* cited by examiner

*Primary Examiner*—Tadesse Hailu
*Assistant Examiner*—Nicholas S Ulrich
(74) *Attorney, Agent, or Firm*—Hickman Palermo Truong & Becker LLP; Christian A. Nicholes

(57) ABSTRACT

Techniques for providing visual feedback to illustrate the effects of editing operations are provided. This visual feedback may be provided in the form of an animated image that visually represents the pre-operation data gradually "morphing" into the data as affected by an operation. The data may be digital signal data that represents a recording of sound, for example. In response to a user's activation of a particular editing operation that affects the data, a resulting visual representation is generated. The resulting visual representation represents the data in the post-operation state, after the effects of the particular editing operation have been applied to the data completely. However, before the resulting visual representation is displayed, intermediate, interpolated visual representations of the data are generated and displayed. Each intermediate visual representation may be displayed successively in the same area as the initial visual representation, one-at-a-time, drawing the user's attention to the operation's effects.

26 Claims, 2 Drawing Sheets

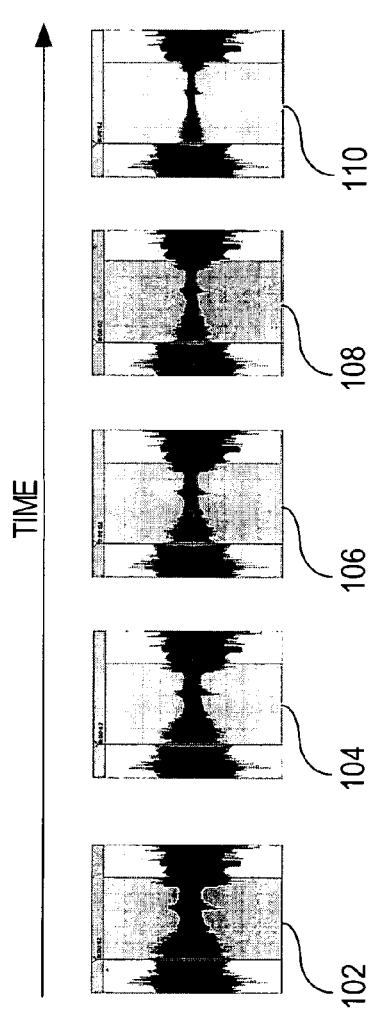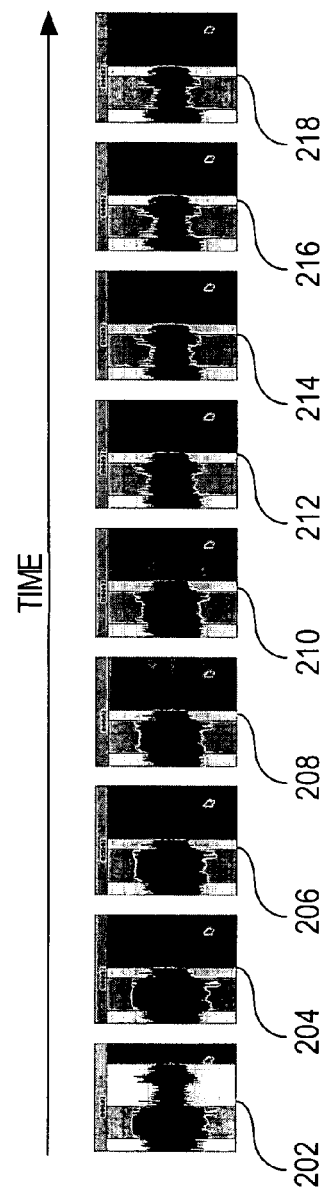

VISUAL FEEDBACK TO ILLUSTRATE EFFECTS OF EDITING OPERATIONS

FIELD OF THE INVENTION

The present invention relates to data-editing programs and, more specifically, to an editing program that provides visual feedback to illustrate the effects of editing operations relative to data.

BACKGROUND

There exist many computer programs today that assist a user in editing data on a computer. For example, a word processing program enables a user to enter and modify textual data. A computer-aided drafting program enables a user to enter and modify graphical data. A digital signal-editing program enables a user to load digital signal data, modify the digital signal data, and save the digital signal data. Such a digital signal may represent audio data, for example.

It is common for such a data-editing program to display a visual representation of the data that is being edited. For example, a digital signal-editing program may display a graph on which a time-by-amplitude representation of an audio signal is plotted. In response to a user's command to perform a particular operation relative to the data, the visual representation typically changes instantaneously from a pre-operation image of the data to a completely post-operation image of the data. Thus, each operation may be seen to correspond to exactly two different "frames" of reference: a "before" frame in which the data appears without any of the effects of the operation, and an "after" frame in which the data appears with all of the effects of the operation.

The editing operations that are performed relative to data might have very subtle effects on the data. Sometimes, an operation's effect on data may be so subtle that a visual representation of the data before the operation may appear to be very similar to a visual representation of the data after the operation. In such circumstances, it can be very difficult for a user to determine, based on the visual representation, whether the data changed at all, and in what manner.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram illustrating multiple frames of an animated waveform that visually depicts the effects of an editing operation relative to digital signal data, according to an embodiment of the invention;

FIG. 2 is a block diagram illustrating multiple frames of an animated waveform that visually depicts the effects of a "cut" operation, according to an embodiment of the invention.

DETAILED DESCRIPTION

Figure 3:
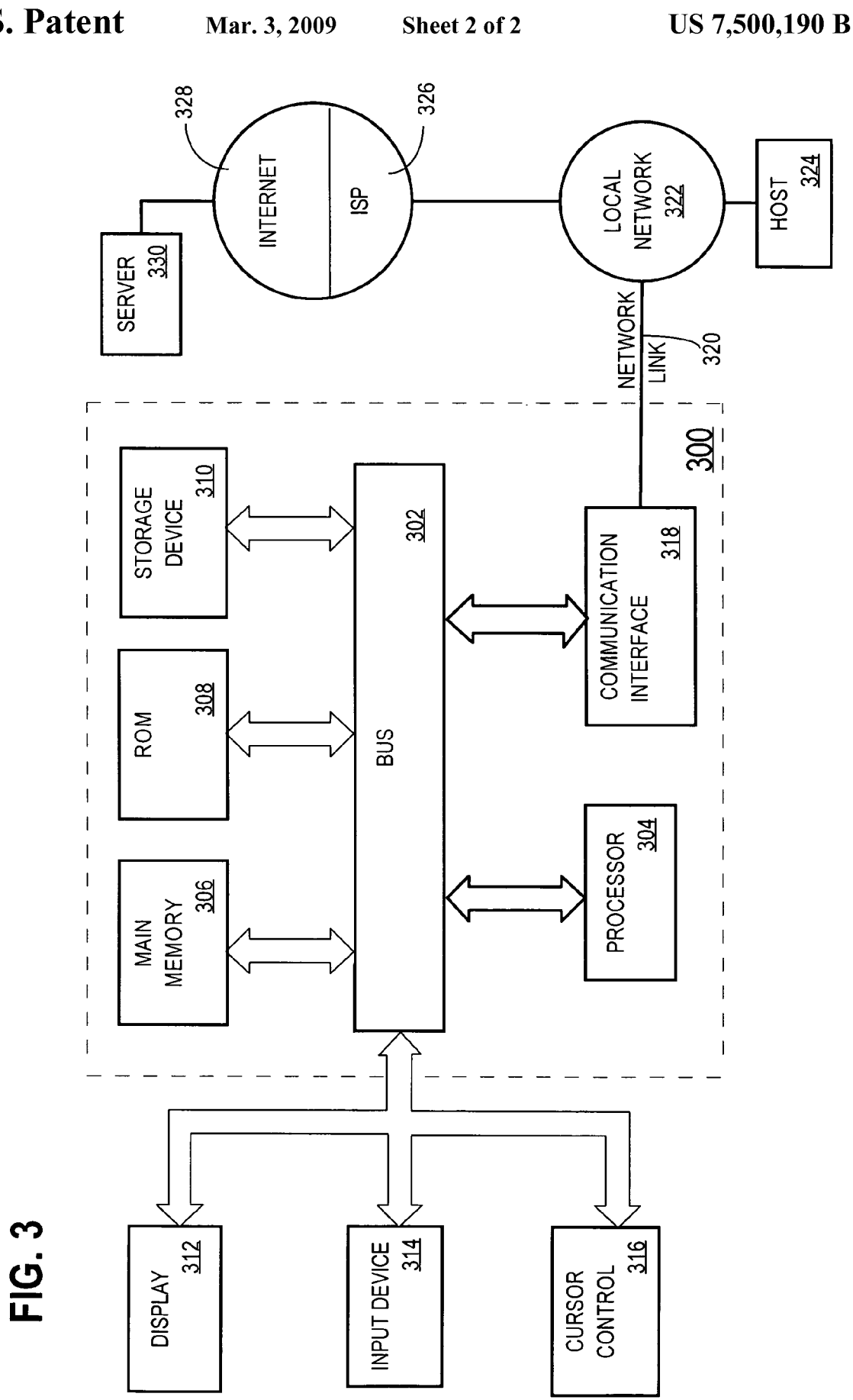
FIG. 3 is a block diagram of a computer system on which embodiments of the invention may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to techniques described herein, an editing program provides visual feedback to illustrate the effects of editing operations relative to data. In one embodiment of the invention, this visual feedback is provided in the form of an animated image that visually represents the pre-operation data gradually "morphing" into the data as affected by the operation. The data may be digital signal data that represents a recording of sound, for example, or any other kind of data.

In one embodiment of the invention, the visual representation of the data initially represents the data in the pre-operation state, before a particular editing operation has been performed relative to the data. In response to a user's activation of a particular editing operation that affects the data, a "resulting visual representation" is generated. The resulting visual representation represents the data in the post-operation state, after the effects of the particular editing operation have been applied to the data completely.

However, according to one embodiment of the invention, this resulting visual representation is not displayed immediately. Before the resulting visual representation is displayed, one or more intermediate visual representations of the data are generated and displayed. Each such intermediate visual representation may be generated by interpolating between the initial visual representation and the resulting visual representation.

Thus, each intermediate visual representation represents the data in a different state. In each of the intermediate visual representations, the effects of the particular editing operation have been only partially applied to the data. Consequently, none of the intermediate visual representations is exactly the same as either the initial or the resulting visual representations. In essence, the display of the sequence of intermediate visual representations shows the gradual changing of the data from before the application of the particular editing operation to after the application of the particular editing operation.

In one embodiment of the invention, each of the intermediate visual representations is displayed in the same area as the initial visual representation, one-at-a-time, in succession; each intermediate visual representation is a separate "frame." The net result is an animated visual representation of how the particular editing operation has affected the data. The effects of the particular editing operation can be seen occurring gradually over time.

Because the way in which an editing operation affects data is presented in a visual and animated manner, the foregoing technique draws a user's attention to the areas of the data that the editing operation affects. Consequently, the user is able to comprehend, in a visual sense, precisely how each editing operation affects the data that he is editing; the user can see which portions of the data are affected and the extent to which those portions are affected. This eases the user's editing work, and empowers the user to edit the data with greater precision. In certain embodiments of the invention in which the data is audio signal data, the foregoing technique is also helpful when audio needs to be synchronized with video.

Example Waveform Animation

In order to provide a concrete example, some embodiments of the invention discussed below are described in the context of digital signal data that represents a recording of sound. However, alternative embodiments of the invention are applicable to data of kinds other than digital signal data and data that represent sound. For example, an alternative embodiment of the invention is applicable to data that represents text. The following description of an embodiment of the invention in a particular data context is not to be construed as a limitation on the invention.

In one embodiment of the invention, a digital signal data-editing program displays a visual depiction of digital signal data on which user-selected editing operations are performed. As operations are performed relative to the digital signal data, the depiction of the digital signal data may change to reflect the effects of the operations on the digital signal data. The digital signal data may be displayed as a function of amplitude relative to time, frequency relative to time, or in a variety of other ways.

Various operations may be performed relative to the digital signal data. Examples of some of these operations include: cut, copy, paste, clear, trim, fade in, fade out, silence, invert, normalize, adjust amplitude, reverse, swap channels, apply ambient noise, real-time effects, time stretch, and reduce noise. A user may select these operations via the selection of menu items, the depression of defined keystrokes, the activation of graphical controls, etc. Some of the operations may be custom "plug-in" operations that a user has generated and which have been incorporated into the digital signal data-editing program.

In one embodiment of the invention, multiple characteristics of digital signal data may be represented within a single image or "frame" of the visual representation. For example, digital signal data may be represented on a two-dimensional graph in which the horizontal axis represents time, the vertical axis represents the amplitude of the digital signal at any given instance in time, and the gradually changing color of a waveform on the graph signifies the frequency of the digital signal at any given instance in time (from deep red at one extreme of the frequency spectrum to deep blue at the other extreme of the frequency spectrum, for example). For another example, digital signal data may be represented through a three-dimensional isometric view of a waveform, in which the X-axis, Y-axis, and Z-axis collectively represent some permutation of signal amplitude, signal frequency, and time.

FIG. 1 is a block diagram illustrating multiple frames of an animated waveform that visually depicts the effects of an editing operation relative to digital signal data, according to an embodiment of the invention. A digital signal data-editing program may display such frames one-at-a-time, in succession, for example.

Referring to FIG. 1, frame 102 contains an initial visual representation of digital signal data, shown as a waveform. Within frame 102, a user-selected time portion of the waveform is displayed differently from the remainder of the waveform. It is to this user-selected portion that the user-specified editing operation is applied.

In response to a user selecting a particular operation that decreases the amplitude of the digital signal in the selected time portion, frames 104-110 are automatically generated and displayed. In one embodiment of the invention, each of frames 104-110 is generated before any of frames 104-110 are displayed. However, in an alternative embodiment of the invention, each of frames 104-110 is displayed after it is generated, even if others of frames 104-110 have not yet been generated. Each of frames 104-110 occupies a different position in a sequence of frames.

Frames 104-110 progressively illustrate the gradual decreasing of the amplitude within the selected portion over time. Each of frames 104-110 may be displayed for a specified period of time (e.g., a tenth of a second), and then replaced with a next frame in the sequence. Frames 104-108 are intermediate visual representations of the digital signal data, while frame 110 is a resulting visual representation of the digital signal data.

In frame 104, the amplitude of the waveform in the selected time portion has decreased somewhat from that shown in frame 102. In frame 106, this amplitude has decreased further from that shown in frame 104. In frame 108, this amplitude has decreased even further from that shown in frame 106. Finally, in frame 110, the amplitude of the waveform in the selected time portion has decreased to the level specified by the editing operation. Thus, the sequence of frames 102-110 comprises an animated portrayal of the effects of the amplitude-reducing editing operation.

Changes in Data Length or Duration

Some operations may change the duration, or time length, of the data on which they are performed. For example, a "cut" operation performed relative to a portion of digital signal data reduces the duration of the digital signal data and, consequently, the length of the waveform that represents the digital signal data. For another example, a "paste" operation may increase the length of the waveform. The effects of operations that change the length of duration of data may be visually portrayed in a variety of ways.

FIG. 2 is a block diagram illustrating multiple frames of an animated waveform that visually depicts the effects of a "cut" operation, according to an embodiment of the invention. As in FIG. 1, FIG. 2 shows an initial frame, a resulting frame, and multiple intermediate frames, although the frames shown in FIG. 2 differ from those shown in FIG. 1.

Referring to FIG. 2, frame 202 contains an initial visual representation of digital signal data, shown as a waveform. Within frame 202, a user-selected time portion of the waveform is displayed differently from the remainder of the waveform. It is to this user-selected portion that the "cut" operation is applied. To both the left and right of the user-selected time portion are other time portions that are not currently selected.

In response to a user selecting a "cut" operation that removes the selected portion of the digital signal, frames 204-218 are automatically generated and displayed. In one embodiment of the invention, frames 204-218 are displayed one-at-a-time rather than simultaneously.

In frame 204, the right-most portion of the waveform disappears, thus representing the shortening of the waveform due to the "cut" operation. The horizontal length of the vanished portion is equivalent to the length of the user-selected region. In the embodiment of the invention shown, the boundaries of the selected area remain the same even after the portion of the waveform that was contained therein was "cut." In the embodiment of the invention shown, the portion of the waveform that vanishes is not the user-selected portion.

In frames 204-218, the portion of the waveform between the leftmost boundary of the selected region and the rightmost boundary of the shortened waveform is gradually changed to become the same as the non-selected portion that existed to the right of the selected portion prior to the performance of the "cut" operation. Each of frames 204-216 contains an intermediate visual representation of the digital signal data.

At last, in frame 218, a resulting visual representation of the digital signal data is shown. In frame 218, the leftmost non-selected portion remains the same as in frames 202-216, but the portion to the right of the leftmost non-selected portion has transformed to become the same as the rightmost non-selected portion in frame 202. Thus, frame 218 is a visual representation of the digital signal data after the "middle" portion has been cut out.

In an alternative embodiment of the invention, a "cut" operation is animated in a different manner than that described above. In such an embodiment of the invention, the user-selected portion vanishes; the vanishing may be instantaneous, or a gradual process implemented through fading. Then, if any particular portion of the waveform existed to the right of the vanished portion, that particular portion gradually "slides" left through one or more intermediate visual representations until it finally abuts any remaining portion of the waveform that existed to the left of the vanished portion (or the leftmost side of the area containing the waveform if there is no such remaining portion).

In yet another alternative embodiment of the invention, a "cut" operation is animated in the following manner: if any particular portion of the waveform existed to the right of the user-selected portion, that particular portion gradually "slides" left through one or more intermediate visual representations until it finally abuts any remaining portion of the waveform that existed to the left of the user-selected portion (or the leftmost side of the area containing the waveform if there is no such remaining portion). As the particular portion slides left as described above, it "squishes" or otherwise obliterates the user-selected portion, thus representing that the user-selected portion is being removed as a result of the "cut" operation.

Operations that increase the length of the data may be depicted in similar ways to those described above. For example, in response to a "paste" operation that inserts a portion of a waveform into an existing waveform, the portion of the existing waveform to the right of the insertion point may gradually slide right through one or more intermediate visual representations until there is sufficient area for the "pasted" portion to be inserted, and then the "pasted" portion may appear (either instantly or gradually) in the vacated area. Alternatively, if the "pasted" portion is placed over an existing portion of the waveform, thus "overwriting" the existing portion instead of being inserted in between two adjacent portions of the waveform, then the existing "overwritten" portion may gradually "morph" into and become the "pasted" portion through one or more intermediate visual representations.

Animated Undo

Typically, an "undo" feature of a data-editing program reverses the effects of the most recently performed operation relative to the data on which that operation was performed. According to one embodiment of the invention, whenever a user activates an "undo" feature, the reversal of the last effect is visibly portrayed in an animated way, similar to the way described above.

For example, if the most recent operation performed relative to a waveform was a "cut" operation, then, in response to a user's activation of the "undo" feature, the intermediate visual representations that were displayed in connection with the original performance of the "cut" operation may be displayed in reverse order. Consequently, the waveform appears to be gradually changing back to its state previous to the "cut" operation.

In one embodiment of the invention, if the most recently performed operation involved a shortening of the data, then the first intermediate visual representation displayed during the "undo" operation shows the lengthening of the data by a corresponding amount. Similarly, in one embodiment of the invention, if the most recently performed operation involved a lengthening of the data, then the first intermediate visual representation displayed during the "undo" operation shows the shortening of the data by a corresponding amount.

Editing Operations Distinguished

According to one embodiment of the invention, the editing operations that are described above differ from other operations that are actually designed, in and of themselves, to produce an animated result. For example, some programs may provide "morph" operations whose sole or main purpose is to cause one image to gradually morph into another image. In such a case, the data on which the operations are performed actually comprises both the data in the original state, before the operations, and the data in the resulting state, after the operations. In such a case, when the data is saved to persistent storage, both the original state and the resulting state are stored to persistent storage, and when the data is loaded from persistent storage, both the original state and the resulting state are restored from storage. In such a case, a "morph" operation is designed to change one set of data into another set of data in an animated way, and the animation that illustrates the transition from one set to the other is included within the data per se.

In contrast, according to one embodiment of the invention, "editing" operations, as described herein, are not intended or designed to morph one image into another image; the effects of the editing operations are visually animated to show transitions between data states, but the animation itself is not a part of the data per se. Thus, in one embodiment of the invention, when the data on which such "editing" operations have been performed is saved to persistent storage, the data resulting from the performance of all of the operations is stored, but the visual representations of states of the data prior to the performance of all of the operations, including any intermediate states, are not stored.

Hardware Overview

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of providing visual feedback to illustrate a data editing operation, the method comprising:
   displaying a first visual representation that represents data that is in a first state; and
   in response to user input that specifies a cut operation that has an effect that places the data in a second state that differs from the first state by removing, from the data, a particular portion of the data that is currently user-selected, performing steps comprising:
   displaying a second visual representation that shows the data as being modified by removing, from the data, a portion of the data that is of a same size as the particular portion but is not the particular portion;

generating a third visual representation that represents the data in the second state; and displaying one or more intermediate visual representations of the data in one or more intermediate states that are interpolated based on (a) a state that corresponds to the second visual representation and (b) the second state;

wherein each of the one or more intermediate visual representations differs from the first and third visual representations.

2. The method of claim 1, wherein the steps further comprise:

after generating the third visual representation, but before displaying the third visual representation, generating the one or more intermediate visual representations by interpolating between the second visual representation and the third visual representation.

3. The method of claim 1, wherein the data is digital signal data that represents a recording of sound.

4. The method of claim 1, wherein the one or more intermediate visual representations comprise one or more images of a waveform.

5. The method of claim 4, wherein the one or more images of the waveform comprise one or more graphs of amplitude over time.

6. The method of claim 4, wherein the one or more images of the waveform comprise one or more graphs of frequency over time.

7. The method of claim 1, wherein displaying the one or more intermediate visual representations comprises displaying each of the one or more intermediate visual representations, one-at-a-time, in succession, in the same area in which the first visual representation was displayed, wherein the display of the intermediate visual representations in succession shows a gradual changing of the data from before the application of the editing operation to after the application of the editing operation.

8. The method of claim 1, further comprising:

in response to user activation of a feature that saves the data to persistent storage, storing the data in the second state to persistent storage without storing the data in the first state to persistent storage.

9. The method of claim 1, wherein the editing operation is not an operation that is designed to morph one image into another image via one or more intermediate images.

10. The method of claim 1, wherein the editing operation is not an operation that produces an animated image, and wherein the step of generating the second visual representation is performed in response to completion of the editing operation.

11. The method of claim 1, further comprising:

in response to user activation of a feature that undoes a most recent change to the data, displaying the one or more intermediate visual representations in reverse order.

12. The method of claim 1, wherein the one or more intermediate visual representations indicate a change to a characteristic of the data through a change in color of at least a portion of a waveform, and wherein the characteristic is one of: amplitude and frequency.

13. A volatile or non-volatile computer-readable storage medium carrying one or more sequences of instructions which, when executed by one or more processors, causes the one or more processors to perform the method recited in claim 1.

14. A volatile or non-volatile computer-readable storage medium carrying one or more sequences of instructions which, when executed by one or more processors, causes the one or more processors to perform the method recited in claim 2.

15. A volatile or non-volatile computer-readable storage medium carrying one or more sequences of instructions which, when executed by one or more processors, causes the one or more processors to perform the method recited in claim 3.

16. A volatile or non-volatile computer-readable storage medium carrying one or more sequences of instructions which, when executed by one or more processors, causes the one or more processors to perform the method recited in claim 4.

17. A volatile or non-volatile computer-readable storage medium carrying one or more sequences of instructions which, when executed by one or more processors, causes the one or more processors to perform the method recited in claim 5.

18. A volatile or non-volatile computer-readable storage medium carrying one or more sequences of instructions which, when executed by one or more processors, causes the one or more processors to perform the method recited in claim 6.

19. A volatile or non-volatile computer-readable storage medium carrying one or more sequences of instructions which, when executed by one or more processors, causes the one or more processors to perform the method recited in claim 7.

20. A volatile or non-volatile computer-readable storage medium carrying one or more sequences of instructions which, when executed by one or more processors, causes the one or more processors to perform the method recited in claim 8.

21. A volatile or non-volatile computer-readable storage medium carrying one or more sequences of instructions which, when executed by one or more processors, causes the one or more processors to perform the method recited in claim 9.

22. A volatile or non-volatile computer-readable storage medium carrying one or more sequences of instructions which, when executed by one or more processors, causes the one or more processors to perform the method recited in claim 10.

23. A volatile or non-volatile computer-readable storage medium carrying one or more sequences of instructions which, when executed by one or more processors, causes the one or more processors to perform the method recited in claim 11.

24. A volatile or non-volatile computer-readable storage medium carrying one or more sequences of instructions which, when executed by one or more processors, causes the one or more processors to perform the method recited in claim 12.

25. A method of providing visual feedback to illustrate a cut operation, the method comprising:

displaying a first visual representation that represents data that is in a first state prior to performance of the cut operation;

generating a second visual representation (a) in which a rightmost portion of the data has been removed, leaving, in the second visual representation, an area that was formerly occupied by the rightmost portion, but is no longer occupied by the rightmost portion and (b) in which a user-selected portion of the data, which is left of the rightmost portion, and which is a portion that a user specified to be a portion that should be removed as a result of the cut operation, remains; displaying the second visual representation;

generating a third visual representation in which particular data, which occupied the rightmost portion when the data was in the first state, has replaced the user-selected portion;

generating one or more intermediate visual representations of the data in one or more intermediate states that are interpolated based on the second and third visual representations;

displaying each of the one or more intermediate visual representations; and displaying the third visual representation;

wherein display of (a) the second visual representation, (b) each of the one or more intermediate visual representations, and (c) the third visual representation produces an effect of the second visual representation morphing into the third visual representation.

26. A volatile or non-volatile computer-readable storage medium carrying one or more sequences of instructions which, when executed by one or more processors, causes the one or more processors to perform steps comprising:

displaying a first visual representation that represents data that is in a first state prior to performance of the cut operation;

generating a second visual representation (a) in which a rightmost portion of the data has been removed, leaving, in the second visual representation, an area that was formerly occupied by the rightmost portion, but is no longer occupied by the rightmost portion and (b) in which a user-selected portion of the data, which is left of the rightmost portion, and which is a portion that a user specified to be a portion that should be removed as a result of the cut operation, remains; displaying the second visual representation;

generating a third visual representation in which particular data, which occupied the rightmost portion when the data was in the first state, has replaced the user-selected portion;

generating one or more intermediate visual representations of the data in one or more intermediate states that are interpolated based on the second and third visual representations;

displaying each of the one or more intermediate visual representations; and displaying the third visual representation;

wherein display of (a) the second visual representation, (b) each of the one or more intermediate visual representations, and (c) the third visual representation produces an effect of the second visual representation morphing into the third visual representation.

\* \* \* \* \*